(12) United States Patent
Wenstrup

(10) Patent No.: US 12,146,322 B2
(45) Date of Patent: Nov. 19, 2024

(54) BITUMEN ROOFING COMPOSITE

(71) Applicant: Milliken & Company, Spartanburg, SC (US)

(72) Inventor: David E. Wenstrup, Greer, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 17/138,128

(22) Filed: Dec. 30, 2020

(65) Prior Publication Data

US 2021/0332591 A1 Oct. 28, 2021

Related U.S. Application Data

(60) Provisional application No. 63/014,184, filed on Apr. 23, 2020.

(51) Int. Cl.
*B32B 5/26* (2006.01)
*B32B 3/16* (2006.01)
(Continued)

(52) U.S. Cl.
CPC ............ *E04D 1/22* (2013.01); *B32B 5/026* (2013.01); *B32B 11/04* (2013.01); *E04D 1/20* (2013.01);
(Continued)

(58) Field of Classification Search
CPC .... E04D 1/22; E04D 1/20; E04D 5/10; B32B 5/026; B32B 11/04; B32B 2419/06; B32B 2262/02; B32B 5/022; B32B 5/028; B32B 5/26; B32B 2250/20; B32B 2262/0253; B32B 2262/0269; B32B 2262/10; B32B 7/08; B32B 2262/103; B32B 2262/106;
(Continued)

(56) References Cited

U.S. PATENT DOCUMENTS 4,230,753 A 10/1980 Sheyon
4,244,817 A 1/1981 Yaginuma
(Continued)

FOREIGN PATENT DOCUMENTS

EP 1710337 10/2006
EP 3483353 5/2019
(Continued)

OTHER PUBLICATIONS

Patent Cooperation Treaty PCT International Search Report. Date of Mailing, May 25, 2020. International Application No. PCT/US2020/019809. International Filing Date: Feb. 26, 2020.
(Continued)

*Primary Examiner* — Phi D A
(74) *Attorney, Agent, or Firm* — Cheryl J. Brickey

(57) ABSTRACT

A bitumen roofing composite is described having an upper surface and a lower surface. The bitumen roofing composite contains a first composite bitumen layer and a fire resistant (FR) fleece. The first composite bitumen layer has a first side and a second side and contains a first carrier saturated with bitumen. The FR fleece has a first side and a second side, where the first side of the FR fleece and the second side of the first bitumen composite layer are in intimate contact. The FR fleece contains a plurality of FR staple fibers and a plurality of first char scaffold fibers.

19 Claims, 2 Drawing Sheets

(51) Int. Cl.
  *B32B 5/02* (2006.01)
  *B32B 11/04* (2006.01)
  *E04D 1/20* (2006.01)
  *E04D 1/22* (2006.01)

(52) U.S. Cl.
  CPC . *B32B 3/16* (2013.01); *B32B 5/26* (2013.01); *B32B 2419/06* (2013.01)

(58) Field of Classification Search
  CPC ............ B32B 2250/02; B32B 2250/03; B32B 2260/021; B32B 2260/023; B32B 2260/042; B32B 2262/0246; B32B 2262/0261; B32B 2262/0276; B32B 2262/0284; B32B 2262/04; B32B 2262/101; B32B 2262/105; B32B 2262/12; B32B 2262/14; B32B 2307/54; B32B 5/024; B32B 7/12; B32B 2307/3065; B32B 2307/5825; B32B 2307/732; B32B 11/10; B32B 5/02; D06N 5/003
  See application file for complete search history.

(56) References Cited

U.S. PATENT DOCUMENTS

| | | | |
|---|---|---|---|
| 4,543,158 | A | 9/1985 | Bondoc |
| 4,595,636 | A | 6/1986 | Wiercinski |
| 4,600,635 | A | 7/1986 | Wiercinski |
| 4,666,761 | A | 5/1987 | Stamper |
| 4,944,818 | A | 7/1990 | Dybsky |
| 5,169,690 | A | 12/1992 | Zimmerman |
| 5,525,413 | A | 6/1996 | Daurer |
| 5,540,022 | A | 7/1996 | Morris |
| 5,658,972 | A | 8/1997 | Grzybowski |
| 6,110,846 | A | 8/2000 | Brzozowski |
| 6,360,511 | B1 | 3/2002 | Brzozowski |
| 6,586,353 | B1 | 7/2003 | Kiik |
| 6,696,125 | B2 | 2/2004 | Zanchetta |
| 6,764,733 | B1 | 7/2004 | Clarke |
| 6,864,195 | B2 | 3/2005 | Peng |
| 6,869,661 | B1 | 3/2005 | Ahr |
| 7,115,313 | B2 | 10/2006 | Zanchetta |
| 7,132,143 | B2 | 11/2006 | Zanchetta |
| 7,153,794 | B2 | 12/2006 | Wenstrup |
| 7,157,137 | B2 | 1/2007 | Wenstrup |
| 7,169,719 | B2 | 1/2007 | Mehta |
| 7,229,938 | B2 | 6/2007 | Wenstrup |
| 7,341,963 | B2 | 3/2008 | Wenstrup |
| 7,446,065 | B2 | 11/2008 | Wenstrup |
| 7,454,817 | B2 | 11/2008 | Wenstrup |
| 7,491,438 | B2 | 2/2009 | Demott |
| 7,521,386 | B2 | 4/2009 | Wenstrup |
| 7,651,964 | B2 | 1/2010 | Thompson |
| 7,709,405 | B2 | 5/2010 | Wenstrup |
| 7,914,635 | B2 | 3/2011 | Thompson |
| 7,977,259 | B2 | 7/2011 | Ratcliff |
| 8,206,817 | B2 | 6/2012 | Donovan |
| 9,523,203 | B2 | 12/2016 | Zhou |
| 9,580,902 | B2 | 2/2017 | Kalkanoglu |
| 9,605,433 | B2 | 3/2017 | Paradis |
| 9,963,880 | B2 | 5/2018 | Kraus |
| 10,017,943 | B1 | 7/2018 | Zhou |
| 10,155,693 | B1 | 12/2018 | Spreen |
| 10,246,802 | B2 | 4/2019 | Jeong |
| 10,443,190 | B2 | 10/2019 | Wenstrup |
| 10,655,329 | B1* | 5/2020 | Redford .................. E04D 1/20 |
| 11,192,328 | B2 | 12/2021 | Zhou |
| 2003/0073368 | A1* | 4/2003 | Berkhoff ............... D04H 1/593 156/181 |
| 2003/0100233 | A1* | 5/2003 | Fynan .................... E04D 5/10 428/192 |
| 2004/0033741 | A1 | 2/2004 | Peng |
| 2004/0127120 | A1* | 7/2004 | Zanchetta ............ B32B 27/12 442/41 |
| 2004/0171318 | A1* | 9/2004 | Rashed .................. B32B 27/12 442/131 |
| 2005/0250399 | A1* | 11/2005 | Kuhn .................... B32B 27/32 442/44 |
| 2005/0282449 | A1* | 12/2005 | Mehta ................... B32B 27/12 442/43 |
| 2006/0116043 | A1 | 6/2006 | Hope |
| 2006/0199453 | A1 | 9/2006 | Kuhn |
| 2006/0228963 | A1 | 10/2006 | Souther |
| 2006/0292945 | A1* | 12/2006 | Kuhn .................... B32B 27/12 442/41 |
| 2007/0066176 | A1 | 3/2007 | Wenstrup |
| 2007/0079926 | A1 | 4/2007 | Mehta |
| 2008/0102243 | A1 | 5/2008 | Gupta |
| 2008/0289289 | A1 | 11/2008 | Wiercinski |
| 2009/0011675 | A1 | 1/2009 | Ratcliff |
| 2010/0087113 | A1 | 4/2010 | Bindschedler |
| 2010/0196653 | A1 | 8/2010 | Curro |
| 2010/0285101 | A1* | 11/2010 | Moore ................... B32B 27/02 424/443 |
| 2012/0237743 | A1* | 9/2012 | O'Donnell ............ B29C 48/08 264/210.1 |
| 2012/0244340 | A1 | 9/2012 | Peng |
| 2013/0052403 | A1 | 2/2013 | Barker |
| 2013/0065470 | A1 | 3/2013 | Rock |
| 2013/0177754 | A1* | 7/2013 | Migliavacca ........ D04H 13/006 28/169 |
| 2014/0013693 | A1 | 1/2014 | Zhou |
| 2014/0062126 | A1 | 3/2014 | Weinberg |
| 2014/0147642 | A1 | 5/2014 | Weinberg |
| 2014/0230999 | A1 | 8/2014 | Weinberg |
| 2014/0335750 | A1 | 11/2014 | Adams |
| 2015/0224751 | A1 | 8/2015 | Oh |
| 2016/0023428 | A1 | 1/2016 | Adams |
| 2016/0039176 | A1 | 2/2016 | Weinberg |
| 2016/0069067 | A1 | 3/2016 | Ciuperca |
| 2016/0237594 | A1 | 8/2016 | Rock |
| 2016/0312471 | A1 | 10/2016 | Hubbard |
| 2017/0044770 | A1 | 2/2017 | Hubbard |
| 2017/0210100 | A1 | 7/2017 | Leatherman |
| 2018/0023301 | A1 | 1/2018 | Wang |
| 2018/0094439 | A1 | 4/2018 | Wang |
| 2018/0100256 | A1 | 4/2018 | Handermann |
| 2018/0257984 | A1 | 9/2018 | Spreen |
| 2018/0305931 | A1 | 10/2018 | Zhou |
| 2018/0362402 | A1 | 12/2018 | Spreen |
| 2018/0370063 | A1* | 12/2018 | Lehmann ................ B32B 27/12 |
| 2019/0003184 | A1 | 1/2019 | Wang |
| 2019/0003185 | A1 | 1/2019 | Wang |
| 2019/0105868 | A1 | 4/2019 | Zhou |
| 2019/0127975 | A1 | 5/2019 | Spreen |
| 2019/0136447 | A1 | 5/2019 | Wenstrup |
| 2020/0070475 | A1* | 3/2020 | Hermans ............ B29C 66/0324 |
| 2020/0173165 | A1* | 6/2020 | Nandi .................... E04D 11/02 |
| 2020/0277790 | A1 | 9/2020 | Wenstrup |
| 2021/0285219 | A1 | 9/2021 | Wenstrup |
| 2021/0332591 | A1* | 10/2021 | Wenstrup ................. B32B 7/08 |

FOREIGN PATENT DOCUMENTS

| | | |
|---|---|---|
| EP | 3483353 A1 | 5/2019 |
| WO | 2001009420 | 2/2001 |
| WO | 2005003447 | 1/2005 |
| WO | 2005010260 | 2/2005 |
| WO | 2011003052 A1 | 1/2011 |
| WO | 2013028250 | 2/2013 |
| WO | 2017197136 A1 | 11/2017 |
| WO | 2020225200 | 11/2020 |

OTHER PUBLICATIONS

PCT/US2021/017262 PCT search report, mail date Apr. 23, 2021, 3 pages.
PCT/US2021/017262 PCT written opinion, dated Apr. 23, 2021, 6 pages.
PCT/US2021/017231 Search report.
PCT/US2021/017231 Written opinion.

(56) References Cited

OTHER PUBLICATIONS

International Preliminary Report on Patentability issued in App. PCT/US2021/01762, mailing date Sep. 22, 2022, 8 pages.
International Preliminary Report on Patentability issued in App. No. PCT/US2021/017231, mailing date Nov. 3, 2022, 7 pages.
Complete Textile Glossary, Celanese Acetate LLC, 2001. 5 pages.
Bull. Mater. Sci., vol. 15, No. 1, Feb. 1992, pp. 67-76.
Search Report and Written Opinion for PCT/US2022/023626 (9 pages). (Year: 2022).

* cited by examiner

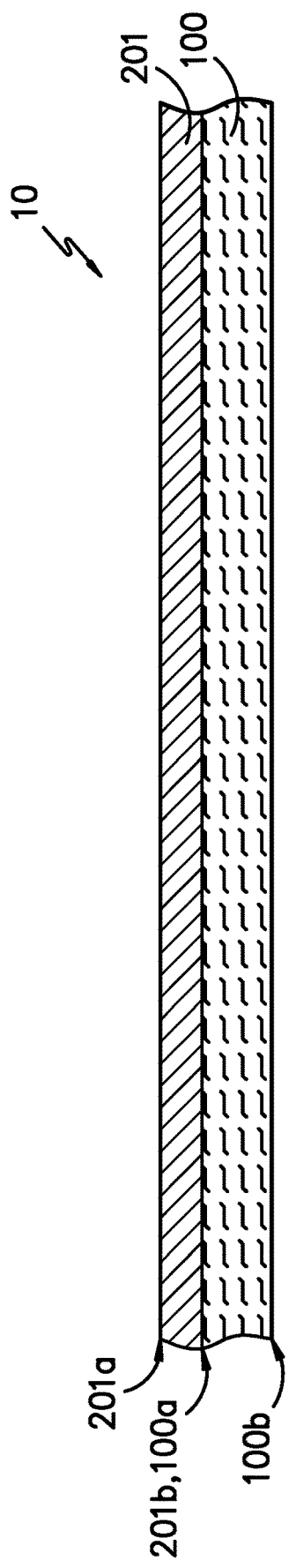
FIG. -1-
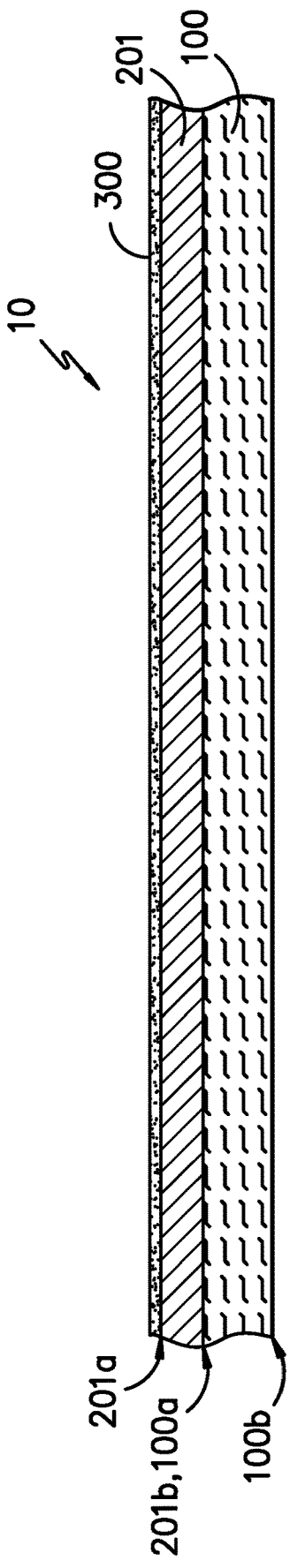
FIG. -2-

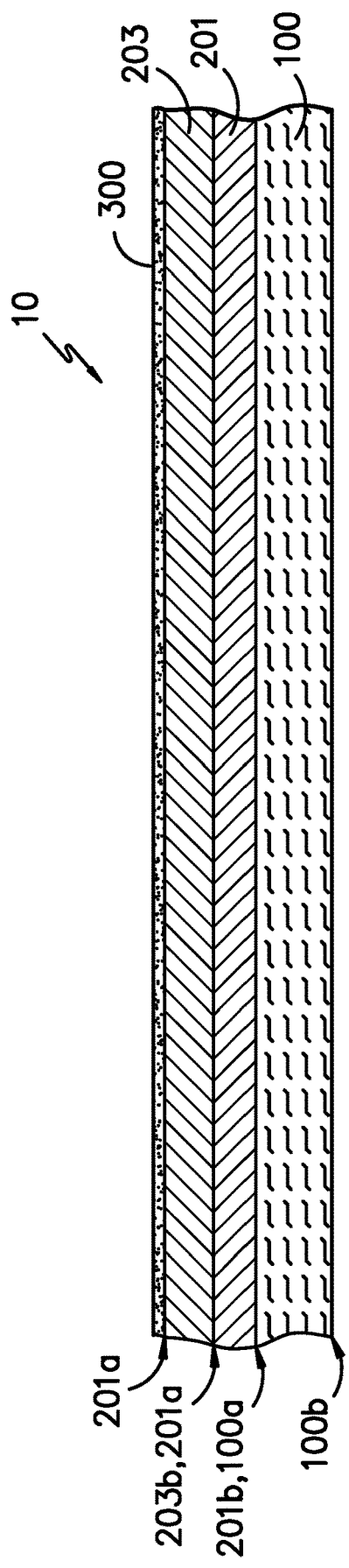
FIG. -3-
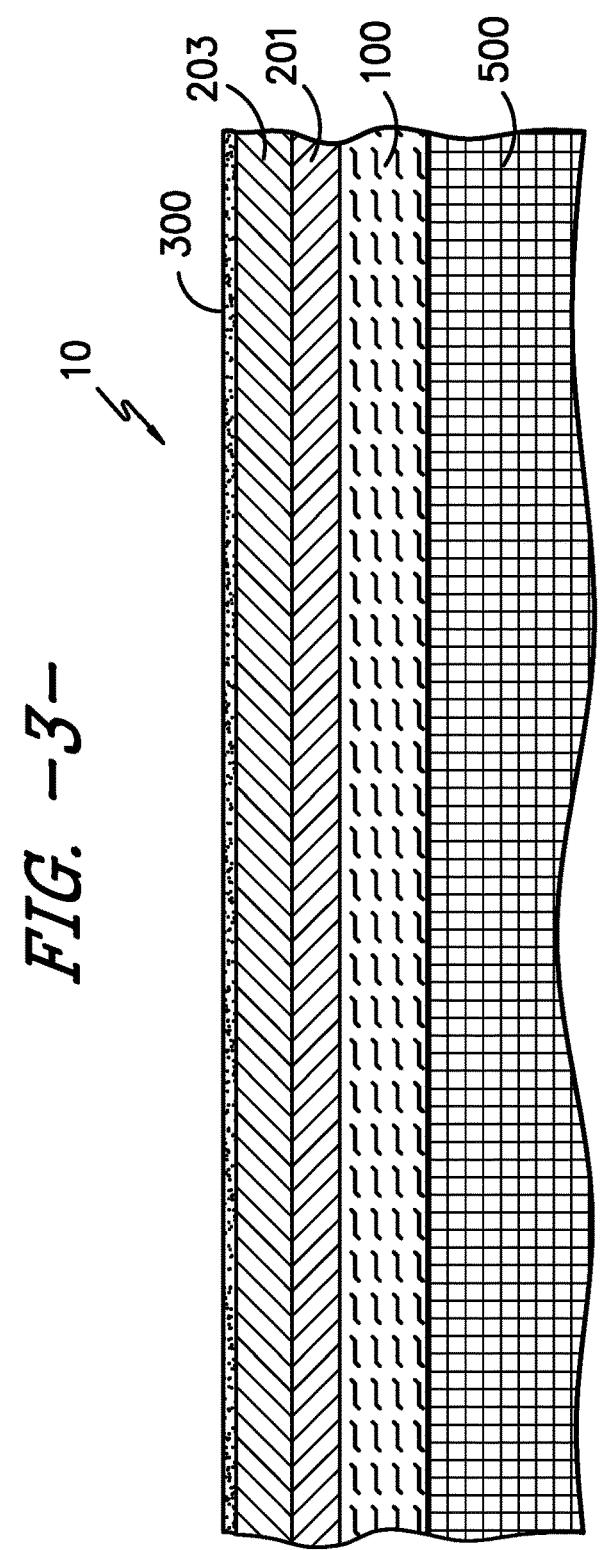
FIG. -4-

BITUMEN ROOFING COMPOSITE

RELATED APPLICATIONS

This application claims priority to Provisional Patent Application 63/014,184 filed on Apr. 23, 2020, which is herein incorporated by reference in its entirety.

TECHNICAL FIELD

The present invention relates generally to bitumen roofing composites, more particularly to bitumen roofing composites with a fleece backing.

BACKGROUND

It is known to use bitumen and granules on carrier as part of a low-slope roofing system. Often, the base bitumen layer is directly adhered to the roof deck or, more typically, to a built-up roof deck using hot mopped bitumen or other adhesive. Additionally, a base layer of gypsum board or other nonflammable material is often incorporated into the system to provide a roofing system that provides an FR class rating. It would be beneficial to have an improved bitumen roofing system incorporating the FR component into the bitumen material as a backing or as an element replacing another FR element for flat or low-slope roofs, traditionally commercial roofs.

BRIEF SUMMARY OF THE INVENTION

A bitumen roofing composite is described having an upper surface and a lower surface. The bitumen roofing composite contains a first composite bitumen layer and a fire resistant (FR) fleece. The first composite bitumen layer has a first side and a second side and contains a first carrier saturated with bitumen. The FR fleece has a first side and a second side, where the first side of the FR fleece and the second side of the first bitumen composite layer are in intimate contact. The FR fleece contains a plurality of FR staple fibers and a plurality of first char scaffold fibers.

The bitumen roofing composite can be attached to a roof deck or a built-up roof deck as part of a roof system. A roof system is disclosed comprising a roof deck, appropriate build-up including, by way of example, polyisocyanurate board for insulation and gypsum board incorporated for FR performance and a bitumen roofing composite adhered to the roof deck or built-up roof deck, where the bitumen roofing composite is oriented such that the lower surface of the bitumen roofing composite faces the roof deck.

BRIEF DESCRIPTION OF THE DRAWINGS

The present invention is best understood with reference to the following detailed description of embodiments of the invention when read in conjunction with the attached drawings, in which like numerals refer to like elements, and in which:

FIGS. 1-3 show cross-sectional illustrations showing different embodiments of the bitumen roofing composite.

FIG. 4 shows a cross-sectional illustration of one embodiment of the bitumen roofing composite on a roof deck or a built-up roof deck.

DETAILED DESCRIPTION

The present invention generally relates to a bitumen roofing composite whereby blended fleeces and optional scrims are used in tandem to generate a high performing bitumen roofing composite for bitumen roofing applications. In some embodiments, this bitumen roofing composite, when applied to the roof deck or built-up roof deck of an architectural structure, is designed to form a 'char barrier' with some structural support. This resultant reinforced char is designed to withstand flame spread to the roof deck or to other elements of the built-up roof deck. In some embodiments, the bitumen roofing composite is designed to meet or exceed several FR testing protocols common in the roofing industry.

Referring now to FIG. 1, there is shown a cross-sectional illustration of one embodiment of the bitumen roofing composite 10 having an upper surface and a lower surface. The bitumen roofing composite 10 contains a first composite bitumen layer 201 having a first side 201a and a second side 201b. The first composite bitumen layer 201 contains a first carrier saturated with bitumen. The bitumen roofing composite 10 also contains a fire resistant (FR) fleece 100 having a first side 100a and a second side 100b. The first side 100a of the FR fleece 100 and the second side 201b of the first bitumen composite layer 201 are in intimate contact. The FR fleece 100 contains a plurality of FR staple fibers and a plurality of first char scaffold fibers.

The first carrier is saturated in any suitable method to form the first composite bitumen layer 201. The bitumen may be applied to the first carrier before, during, or after installation of the carrier to a roofing system.

Bitumen is a dense, highly viscous, petroleum-based hydrocarbon that is found in deposits such as oil sands and pitch lakes (natural bitumen) or is obtained as a residue of the distillation of crude oil (refined bitumen). In some areas, particularly in the United States, bitumen is often called asphalt, though that name is almost universally used for the road-paving material made from a mixture of granules (sometimes also referred to as gravel), sand, and other fillers in a bituminous binder. Roofing granules may be either natural stone or synthetic materials.

Bitumen is also frequently called tar or pitch—though, properly speaking, tar is a byproduct of the carbonization of coal and pitch is actually obtained from the distillation of coal tar.

Bitumen is defined by the U.S. Geological Survey as an extra-heavy oil with an API gravity less than 10° and a viscosity greater than 10,000 centipoise. At the temperatures normally encountered in natural deposits, bitumen will not flow; in order to be moved through a pipe, it must be heated and, in some cases, diluted with a lighter oil. It owes its density and viscosity to its chemical composition—mainly large hydrocarbon molecules known as asphaltenes and resins, which are present in lighter oils but are highly concentrated in bitumen. In addition, bitumen frequently has a high content of metals, such as nickel and vanadium, and nonmetallic inorganic elements, such as nitrogen, oxygen, and sulfur. Depending on the use to which bitumen is put, these elements may be contaminants that have to be removed from the finished product. By far most refined bitumen is used in paving asphalt and roofing tiles, as is a large amount of natural bitumen. When bitumen is used for roofing applications such as a composite bitumen layer as described herein, the bitumen may be modified through incorporation of or blending with other materials such as styrene-butadiene-styrene rubber (SBS) or atactic polypropylene (APP) for purposes including, but not limited to, increased flexibility or toughness. Use of the term "bitumen" herein includes embodiments wherein the bitumen has been modified as just described.

The first composite bitumen layer 201 preferably has a thickness (defined as the distance between the first 201a and second side 201b of the first composite bitumen layer 201) of between about 5 and 300 mils. In one embodiment, the first carrier is a knit, woven, or nonwoven scrim or nonwoven mat. In one embodiment, the first carrier can be a combination of a scrim and a mat, preferably where the scrim is attached to or embedded into the mat. In one preferred embodiment, the first carrier is a laid scrim with continuous fibers/yarns. In another preferred embodiment, the first carrier is a nonwoven mat containing staple fibers. In another preferred embodiment, the first carrier is a nonwoven mat containing chopped glass strand. Preferably, in one embodiment, the fibers (either staple or continuous) are preferably glass. Glass has been found to work well with bitumen and has good properties and cost. In one preferred embodiment, the first carrier is a laid scrim with continuous fiberglass fibers/yarns. In another preferred embodiment, the first carrier is a nonwoven mat containing staple (chopped) fiberglass fibers. In one embodiment, the first carrier may be a plurality of yarns that are not in the form of a scrim. These yarns may be randomly arranged or oriented in a unidirectional direction, for example. In one embodiment, the scrim contains both staple and continuous filament fibers.

In one embodiment, shown in FIG. 2, the roofing composite 10 further comprises a plurality of granules 300 on the first side 201a of the first bitumen composite layer 201. This plurality of granules 300 preferably forms the upper surface of the bitumen roofing composite 10 (thus forming the outermost layer of the roofing composite which is exposed to rain, snow, and other elements). The granules are any suitable granules particle known to be placed on bitumen roofing systems. A layer of granules, or small stones, is applied on top of the final coating of asphalt to protect the roof from the elements, including ultraviolet (UV) rays and hail. The granules are preferably embedded into the bitumen, which helps the granules stay in place.

In another embodiment, as shown in FIG. 3, the bitumen roofing composite contains a second composite bitumen layer 203. This second composite bitumen layer 203 has a first 203a and a second side 203b. The second composite bitumen layer 203 may be same or different (thickness, bitumen composition, scrim type and construction, etc.) as the first composite bitumen layer 201. The second composite bitumen layer 203 contains a second carrier saturated with bitumen. This second carrier and bitumen may be selected from any materials and processes described in relation to the first carrier.

The second side 203b of the second composite bitumen layer 203 is adjacent and attached to the first side 201a of the first composite bitumen layer 201. Preferably, the first 201 and the second 203 composite bitumen layers are installed such that the first and second composite bitumen layers are cross-lapped. This means that the layers are perpendicular to one another (while still in the plane of the roof). This has been shown to help prevent moisture penetration through the bitumen roofing composite 10 to the roof deck or built-up roof deck. The bitumen roofing composite 10 may be supplied to the job site as a bitumen roofing composite 10 or may be assembled from the layers on the job site.

In one embodiment, the first side 203a of the second composite bitumen layer 203 comprises a plurality of granules and forms the upper surface of the bitumen roofing composite 10 (thus forming the outermost layer of the roofing composite which is exposed to rain, snow, and other elements). The granules may be applied and have the same materials as described above. In one embodiment, shown in FIG. 3, the roofing composite 10 further comprises a plurality of granules 300 on the first side 203a of the first bitumen composite layer 203.

The layer of FR fleece 100 is included in the bitumen roofing composite 10 facing a roof deck or a built-up roof deck to both protect the first (and optionally second) composite bitumen layers 201, 203 and to enhance membrane adhesion to the roof deck or to the built-up roof deck. The FR fleece 100 has a first 100a and a second side 100b. The first side 100a of the FR fleece 100 and the second side 201b of the first composite bitumen layer 201 are in intimate contact and attached. The second side 100b of the FR fleece preferably forms the lower surface of the bitumen roofing composite 10 and is typically what would be attached to a roof deck or a built-up roof deck. The FR fleece 100 and first composite bitumen layer 201 may be attached together using any suitable means including the bitumen from the first composite bitumen layer 201, an additional adhesive, or any mechanical fastener.

In one embodiment, the fleece 100 is constructed as a fire resistant (FR) fleece to give the protections to impart some FR characteristics to the bitumen roofing composite 10. Specifically, the FR fleece is designed to create a structurally stable char barrier which once formed will protect the built up roofing system and/or roof deck from a fire event.

The FR fleece preferably contains a plurality of a plurality of FR fibers and a plurality of first char scaffold fibers. In one embodiment, the FR fleece 100 comprises between about 30 and 70% by weight FR staple fibers, between about 20 and 50% by weight FR first char scaffold fibers. Preferably, the FR staple fibers are FR rayon staple fibers. In another preferred embodiment, the FR fleece 100 also contains non-FR fibers. In one embodiment, the FR fleece 100 contains between about 0 and 30% by weight non-FR (typically polyester with no FR additives) fibers. In another embodiment, the FR fleece 100 contains less than about 25% wt non-FR fibers, preferably less than about 15% wt. In another embodiment, the FR fleece 100 contains at least 1% wt non-FR fibers, preferably greater than about 5% wt.

The non-FR fibers may be any suitable fiber and are included for loft and bulking of the fleece. Non-FR fibers tend to be less expensive than FR fibers so it is advantageous from a cost standpoint to be able to include a percentage of non-FR fibers in the FR fleece 100. These non-FR fibers provide volume in the z direction (perpendicular to the plane of the bitumen roofing composite) of the nonwoven material. Types of bulking fibers would include fibers with high denier per filament (5 denier per filament or larger), high crimp fibers, hollow-fill fibers, and the like. These fibers provide mass and volume to the material. Examples of fibers used as bulking fibers include polyester, and polypropylene, as well as other low cost fibers. In one embodiment, the non-FR fibers are thermoplastic fibers, preferably polyester fibers. Preferably, the polyester fibers are crimped to maximize the amount of loft from the fibers. Additionally, these non-FR fibers help to carry the FR fibers which typically have little to no crimp and can be quite brittle. In one embodiment, the percentage by weight of non-FR fibers in the FR fleece is between about 0 and 80% wt, more preferably between about 0 and 35% wt, more preferably between about 0 and 20% wt.

The FR fleece also contains an FR fiber, which is defined to be fibers having a Limiting Oxygen Index (LOI) value of 20.95 or greater, as determined by ISO 4589-1. The FR fiber may be, for example, FR chemically treated fibers and/or inherently FR fibers. Preferably, the FR fibers are FR rayon staple fibers. In one embodiment, the percentage by weight of FR fibers in the FR fleece is between about 20 and 80%, more preferably between about 25 and 65, more preferably between about 25 and 45%.

The FR fleece also preferably includes a plurality of first char scaffold fibers. Char scaffold fibers are defined to be fibers that once burned, retain a portion (at least about 80%) of their original strength. These fibers give strength to the fleece after other FR fibers such as the FR rayon fibers are oxidized into a char barrier. The char scaffold fibers may be mineral fibers such as silica and basalt, aramids, carbon fibers including partially oxidized polyacrylonitrile (PAN) and fully carbonized carbon, ceramic fibers. Preferably, the char scaffold fibers are partially oxidized acrylonitrile (also sometimes referred to as PANOX) staple fibers or silica staple fibers. In one embodiment, the char scaffold fibers are partially oxidized acrylonitrile staple fibers. In another embodiment, the char scaffold fibers are silica staple fibers. Preferably, the FR fibers and char scaffold fibers are different fibers (made from different materials). In one embodiment, the percentage by weight of first char scaffold fibers in the FR fleece is between about 20 and 80%, more preferably between about 25 and 65, more preferably between about 25 and 45%.

In a further preferred embodiment, a 50/50 mixture by weight of partially oxidized acrylonitrile fabrics and mineral fibers provided a surprising FR improvement in performance due to increased char strength.

Often the char scaffold fibers employed are more brittle and contain significantly less crimp than more traditional fibers used in these applications. For these reasons, numerous enhancements are encouraged including elliptical needling, and proper blending of the fibers in terms of both type and denier to allow proper web formation and carriage through the carding process. Additionally, appropriate web weight and number of crosslaps becomes extremely important when dispersing fibers such as silica and basalt to impart a scaffolding to the char barrier formation.

The fibers in the FR fleece are typically blended to create a uniform fiber blend but when certain performance characteristics are desired can be stratified and or layered. Additionally, the FR fleece may have additional treatments added to it after batt formation including intumescent chemistries, elliptical needle entanglement, calendering, and the like.

In one embodiment, the nonwoven fleece has a tensile strength of between 100 and 1000 lb/f and a tear strength of between 50 and 500 lb/f. This strong fleece may be regular or FR. Tensile strength is measured according to ASTM D4632 and tear strength is measured according to ASTM D4533.

In one embodiment, the fleece (which in one embodiment is an FR fleece 100) may have a reinforcing scrim located within the fleece. The reinforcing scrim embedded into the fleece and the nonwoven fleece (including the scrim) preferably has a tensile strength of between 100 and 1000 lb/f and a tear strength of between 50 and 500 lb/f. Tensile strength is measured according to ASTM D4632 and tear strength is measured according to ASTM D4533. This reinforcing scrim may contain the first char scaffold fibers (therefore contributing the first scaffold fibers to the FR fleece 100 when the scrim is located in the fleece) or alternatively, may contain second char scaffold fibers. In this embodiment, the FR fleece would contain first char scaffold fibers (preferably as loose fibers) and second char scaffold fibers in the form of a reinforcing scrim. The second char scaffold fibers may be selected from the same group of materials as the first char scaffold fibers. In one embodiment, the second char scaffold fibers are a different fiber than the first char scaffold fibers. In one embodiment, the reinforcing scrim can be made from the same materials (preferably glass fibers) as the first carrier.

The reinforcing scrim in the FR fleece 100 provides additional integrity to the fleece both before and after a fire event. The reinforcing scrim is preferably incorporated into the fleece, preferably needle-punched with the nonwoven fibers to create the nonwoven fleece. It has been found that the addition of the scrim within the fleece increased the strength of the fleece as compared to having the scrim on one side of the fleece. Preferably, the scrim within the FR fleece 100 comprises a plurality of yarns. These yarns are preferably formed from a plurality of fibers which have an average staple length of at least about 12 inches. More preferably, the fibers have an average staple length of at least about 20 inches, more preferably at least about 10 feet, more preferably at least about 100 feet, more preferably considered continuous yarns. In another embodiment, the fleece may contain a plurality of yarns as described above not in a scrim structure. The reinforcing scrim can be any suitable fabric including knit, woven, or non-woven and has a machine and cross-machine direction. The reinforcing scrim preferably has a thickness of between about 5 and 15 mils. In one embodiment, the FR fleece contains a plurality of yarns that are not in the form of a scrim, these may be unidirectional or randomly placed yarns within the fleece.

In one embodiment, the reinforcing scrim is a laid scrim where yarns (or fibers) are laid in the machine and cross machine direction or multi-axially and are attached together at their cross-over points. Typically, the scrim is designed in an open construction such that fibers from the nonwoven pass around and through the scrim. Preferably, tensile strength of the reinforcing scrim in the machine direction is at least about 100 lb/f. This allows installation of the roofing membrane from large rolls without significant distortion. Additionally, it improves the wind uplift performance of the roofing system.

The yarns/fibers making up the reinforcing scrim within the FR fleece 100 may be any suitable yarn or fiber. "Yarn", in this application, as used herein includes a monofilament elongated body, a multifilament elongated body, ribbon, strip, fiber, tape, and the like. The term yarn includes a plurality of any one or combination of the above. The yarns may be of any suitable form such as spun staple yarn, monofilament, or multifilament, single component, bi-component, or multi-component, continuous filament and have any suitable cross-section shape such as circular, multi-lobal, square or rectangular (tape), and oval. Some suitable materials for the yarns include aramid (including meta and para forms), polyester, polyolefin, nylon (including nylon 6, nylon 6,6, and nylon 4,6), steel, carbon, fiberglass, and polyethylene terephthalate (polyester or PET). In one preferred embodiment, the scrim contains polyester yarns. In another preferred embodiment, the scrim contains glass fibers.

The bitumen roofing composite 10 is preferably attached to a roof deck or built-up roof deck 500 (or other structure) such as shown in FIG. 4. The bitumen roofing composite 10 is preferably oriented such that the FR fleece 100 is adjacent the roof deck or to the built-up roof deck 500. Preferably, the plurality of granules 300 forms the outermost layer of the composite 10 and is exposed to the weather elements. The thickness of the bitumen roofing composite is between about 20 and 201 mils. Preferably, the areal weight of the bitumen roofing composite 10 is between about 50 and 500 ounces per square yard.

A roof deck is generally described as a construction member or system comprising one or more essentially planar elements of, but not limited to steel, aluminum, concrete, wood, gypsum, composites, or other rigid or semi-rigid materials and which may form or rest upon one or more structural construction members, and which serves either as a complete roofing system or, more typically, as a base onto which additional roofing elements are added or built up.

A built-up roof deck is generally described as a roofing system comprising one or more essentially planar, parallel, and/or co-planar elements built up from among a roof deck; asphalt or bituminous layer(s); adhesive layer(s); textile layers; insulating layer(s) of foam or other materials; textile reinforcement layer(s); paper, film and/or membrane layers; board or composite layer(s) of wood, gypsum, gypsum plus fiber, foam, cement, concrete, or other rigid or semi-rigid materials, with or without paper and/or textile facer(s) and/or reinforcement layer(s); waterproofing material layer (s) comprising one or more polymers, elastomers, asphalts, or bitumens, with or without plasticizers, other additives or modifiers, and/or textile reinforcement; sheet metal layer(s); functional coating layer(s); granule or granules layer(s); and other layer(s); and which may or may not further comprise attachment fasteners disposed more or less perpendicularly to one or more of the planar, parallel, and/or co-planar elements. The built-up roof deck may refer to either 1) a complete roofing system comprising a roof deck plus one or more essentially planar, parallel, and/or co-planar elements as described above, with or without fasteners; or, 2) an incomplete or partial roofing system comprising a roof deck plus one or more essentially planar, parallel and/or co-planar elements as described above, with or without fasteners, but also omitting certain essentially planar, parallel and/or co-planar elements as described above.

Another way of describing a built-up roof deck is a roofing system comprising one or more essentially planar, parallel and/or co-planar elements added or built up for purposes including, but not limited to waterproofing, insulation, wind uplift resistance, fire resistance and/or retardance, forming a moisture and/or vapor barrier, adhesion, hail resistance, resistance to damage from foot or machine traffic, ultraviolet radiation protection, resistance to chemical or biological degradation, and the like, and which may or may not further comprise attachment fasteners disposed more or less perpendicularly to one or more of the planar, parallel, and/or co-planar elements. The built-up roof deck may refer to either 1) a complete roofing system comprising a roof deck plus one or more essentially planar, parallel and/or co-planar elements as described above, with or without fasteners; or, 2) an incomplete or partial roofing system comprising a roof deck plus one or more essentially planar, parallel and/or co-planar elements as described above, with or without fasteners, but also omitting certain essentially planar, parallel and/or co-planar elements as described above.

Adhesion between all of the layers within the composite 10 is very important to insure proper performance in the composite roofing application, for example wind uplift is tested for all roofing membranes and ply to ply adhesion must be strong enough to withstand pressures of at least about 60 psi, more preferably at least about 120 psi. Traditional application of the composite membrane structure to a roof deck is done with decking screws and washers, followed by overlapping of the next membrane layer to cover the screw and washer hardware from the weather. Recent advances in adhering roofing membranes to roof decks or to built-up roof decks have focused on using adhesives to fully adhere the entire membrane to the roof deck or to the built-up roof deck. In one embodiment, composites are fully 'glued' down to the built-up roof deck. This can often display significantly improved wind uplift results by eliminating pockets of non-adhered membrane from uplifting and causing stress on the mechanically adhered sections. There may be additional adhesives between the layers within the bitumen roofing composite 10, or in some embodiments, the bitumen serves as the adhesive between adjacent elements within the composite 10.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A bitumen roofing composite having an upper surface and a lower surface comprising:
   a first composite bitumen layer having a first side and a second side, wherein the first composite bitumen layer comprises a first carrier saturated with bitumen, wherein the first carrier is a laid scrim comprising continuous fibers or yarns; and
   a fire resistant (FR) fleece having a first side and a second side, wherein the first side of the FR fleece and the second side of the first bitumen composite layer are in intimate contact, wherein the FR fleece comprises a plurality of FR staple fibers and a plurality of first char scaffold fibers, and wherein the FR fleece further comprises a reinforcing scrim, wherein the reinforcing scrim is embedded into the FR fleece and comprises the first char scaffold fibers.

2. The bitumen roofing composite of claim 1, wherein the second side of the FR fleece forms the lower surface of the bitumen roofing composite.

3. The bitumen roofing composite of claim 1, wherein the roofing composite further comprises a plurality of granules on the first side of the first bitumen composite layer, wherein the plurality of granules forms the upper surface of the bitumen roofing composite.

4. The bitumen roofing composite of claim 1, further comprising a second composite bitumen layer having a first side and a second side, wherein the second composite bitumen layer comprises a second carrier saturated with bitumen.

5. The bitumen roofing composite of claim 1, wherein the first char scaffold fibers are selected from the group consisting of partially oxidized acrylonitrile fibers, silica fibers, and ceramic fibers.

6. The bitumen roofing composite of claim 1, wherein the FR fleece comprises between about between about 30 and 70% by weight FR staple fibers, between about 20 and 50% by weight char scaffold fibers, and between about 0 and 30% by weight polyester fibers.

7. A roofing system comprising the bitumen roofing composite of claim 2 attached to a roof deck or built-up roof deck, wherein the bitumen roofing composite is oriented such that the lower surface of the bitumen roofing composite faces the roof deck or built-up roof deck.

8. A roofing system comprising the bitumen roofing composite of claim 4 attached to a roof deck or built-up roof deck, wherein the bitumen roofing composite is oriented such that the lower surface of the bitumen roofing composite faces the roof deck or built-up roof deck.

9. The bitumen roofing composite of claim 1, wherein the first carrier comprises a first carrier scrim.

10. The bitumen roofing composite of claim 1, wherein the first carrier comprises a first nonwoven mat.

11. The bitumen roofing composite of claim 1, wherein the first carrier comprises a plurality of yarns.

12. The bitumen roofing composite of claim 1, wherein the first carrier comprises a first carrier scrim and a first nonwoven mat.

13. The bitumen roofing composite of claim 12, wherein the first carrier scrim and the first nonwoven mat are attached together.

14. The bitumen roofing composite of claim 12, wherein the first carrier scrim is embedded into the first nonwoven mat.

15. The bitumen roofing composite of claim 1, wherein the first carrier comprises a plurality of yarns and a first nonwoven mat.

16. The bitumen roofing composite of claim 15, wherein the plurality of yarns and the first nonwoven mat are attached together.

17. The bitumen roofing composite of claim 15, wherein the plurality of yarns is embedded into the first nonwoven mat.

18. The bitumen roofing composite of claim 15, wherein the first carrier scrim comprises a plurality of glass fibers.

19. The bitumen roofing composite of claim 1, wherein the FR fleece further comprises a plurality of second char scaffold fibers in a reinforcing scrim embedded into the fleece selected from the group consisting of glass fibers, carbon fibers, partially oxidized acrylonitrile fibers, polyphenylene sulfide fibers, and aramid fibers.

\* \* \* \* \*